Aug. 12, 1969 P. F. J. RECCA 3,461,276

REUSABLE DATA CARD

Filed Oct. 20, 1965

INVENTOR:
P. F. J. RECCA

BY Michael J. Borsella
ATTORNEY.

United States Patent Office 3,461,276

Patented Aug. 12, 1969

3,461,276

REUSABLE DATA CARD

Pasquale F. J. Recca, Bergenfield, N.J., assignor to The Western Union Telegraph Company, New York, N.Y., a corporation of New York Filed Oct. 20, 1965, Ser. No. 498,229
G06k 19/00
U.S. Cl. 235—61.12 1 Claim

ABSTRACT OF THE DISCLOSURE

A data storage card has a plurality of straight conductive members spaced apart and extending transversely across the card. Adjacent each member and parallel thereto is a column of short, spaced, conductive, data storage elements. Connected to opposite ends of each straight member are conductive bridge elements. Connected to the bridge elements are short conductive terminals disposed in alignment with the column of short data storage elements.

The present invention relates generally to card memory or storage devices adaptable to retain information to be later read by card reading devices such as the data card transmitter shown and described in United States Patent 3,232,604.

Such devices are generally called data cards and contain a number of conductive members coupled electrically to a common conductive terminal and the members are positioned adjacent to, but not connected electrically with a column of isolated spaced conductive elements. Each isolated conductive element represents a particular piece of information such as a number, letter, symbol, cipher, word, or combinations thereof. To recall the information represented by any particular isolated element it is only necessary to trace a conductive path from that element to the common conductive terminal. This step may be accomplished by means of a stylus which leaves a conductive mark, such as a soft lead pencil or the like. A line is drawn with the stylus from the particular isolated element to the adjacent conductive member, thereby making an electrical connection. The card so marked then is processed through a card reading device of the type aforementioned to recall or transmit the information stored on the isolated area selected.

The connecting operation while described by means of a hand held stylus may also be accomplished by means of mechanical equipment such as a typewriter or other equipment as may be practical in the premise.

In such cards of the prior art a column of isolated elements is generally flanked by a conductive member positioned parallel to the column of isolated element. The conductive member so positioned connects to a common terminal, slightly offset relative to the conducting member, because the common terminal is linearly disposed with respect to the column of isolated elements. This linear disposition is necessary because in the sensing operation, the sensing means on the data card transmitter above referred to comprise a row of linearly disposed conductive prongs or brushes which sweep above the surface of the card in light contact therewith. It is required that the sensing means make contact with the particular isolated element connected to the common terminal, and with the common terminal simultaneously. Hence, the linear arrangement of the common terminal with the column of isolated elements, is necessary in the sensing process.

A disadvantage of the heretofore devised cards of this type, however, lies in the fact that if an error were made in selecting the isolated element and connecting the same with the common terminal, the error could not be remedied by erasing means. It was not possible to erase the conductive path made by means of the stylus or the like and select another isolated element for connection instead, because in the erasing process the conductive path parallel to the line of isolated elements would be broken so that there was no continuity of circuit between the common terminal and the new isolated element selected. The card had to be discarded and a new unblemished card used.

The within improvement contemplates overcoming the stated disadvantage in a simple and effective manner by providing a second terminal colinearly disposed with the column of isolated terminals, but on the opposite end thereof from the normal and existing common terminal. In effect, this arrangement as hereafter more specifically explained provides a second or alternate conductive path between the isolated elements and the sensing means on the data card transmitter, so that if one such path is broken, as by an erasure, or correction, or the like, the second, or alternate path will remain operative. In this manner, there are provided means for making at least one correction, or revision on the data card after the first stylus made conductive connection between a particular isolated element and the common terminal.

By means of this arrangement it is also possible to use a card at least twice by simply erasing any existing stylus mark thereon and making a new mark to connect a different isolated element to the common terminal, thereby effecting an economy in card consumption.

It is therefore one of the objects of this invention to provide an improved card storage member.

Another object of the invention is to provide a card storage member of the above indicated nature which supports conductive paths formed by means of a stylus and such path may be erased or obliterated and another path traced in place thereof.

Another object of the invention is to provide a card storage member adapted to be sensed by data card sensing means, embodying an alternate conductive path between the card and the sensing means.

It is a further object of this invention to provide a card of the above indicated nature which increases the economy of operation of the card and card sensing complex by providing means for utilizing erroneously marked cards, or cards already marked once.

It is a further object of this invention to provide a card of the above indicated nature which shall be simple and economical to use yet positive and reliable in operation.

The above, and other objects and advantages and features will appear more fully hereinafter from a consideration of the detailed description which follows, taken together with the accompanying drawing wherein one embodiment of the invention is illustrated by way of example. It is to be expressly understood however that the drawing is for the purpose of illustration only and is not to be construed as defining the limits of the invention, reference being had for this purpose to the appended claim.

In the drawing wherein like reference characters indicate like parts;

Figure 1:
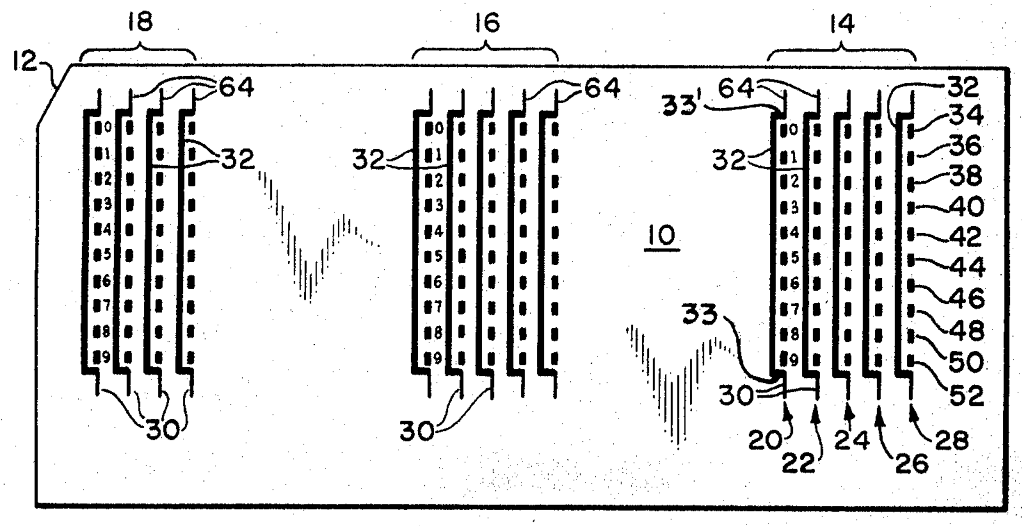
FIGURE 1 shows the front view of a data card constructed in accordance with the principles of this invention.

Referring now to the drawing and more particularly to FIG. 1 there is shown a flat rectangular data card 10. The card 10 may be composed of paper electrically non-conductive material such as cardboard, plastic or the like, and formed to a desired size, with an orientating cutout 12 in a corner thereof. A number of sections 14, 16 and 18 are shown on the card by way of example and may be designated as variable data sections. The information thereon relates to purposes for which the card is being used. For example in a payroll application section 14 would have the employees names, the number of hours worked, the date and probably additional information such as social security number, deductions data and the like. An inventory section 16 may reasonably be expected to contain such information as quantity removed from stock, quantity remaining, dates, cost indicia, and the like.

Section 14 for example contains five columns: 20, 22, 24, 26 and 28. Each column comprises two linear conductive terminals 30, 64 connected electrically to a straight linear member 32 extending transversely across the card by bridge elements 33, 33'. And each column also contains a number of short, spaced, rectangular conductive elements 34, 36, 38, 40, 42, 44, 46, 48, 50 and 52 extending in a line transversely across the card parallel to member 32 and slightly spaced therefrom. The section 14 is similar in design, construction and operation to each of the other sections 16 and 18 and all contain columns such as 20, 22, 24, 26 and 28.

Sections 16 and 18 containing five and four columns, respectively, are similarly constructed and need not be individually considered for purposes of this invention, the description with respect to column 28 being typical for said purpose.

The electrical conducting member 32 is positioned adjacent to each of the ten elements. The linear conductive elements 30, 64 are connected to the straight member 32 by short, conductive bridges 33, 33' and are slightly offset relative to the conductive member 32 to align the terminals 30, 64 with the line formed by the ten isolated elements therebetween.

The ten isolated elements, the terminals 30, 64, and the conductive member 32 are each composed of material which conducts electricity readily such as silver, gold, copper, aluminum, carbon and the like. The card 10 is composed of material which acts as an insulator.

Figure 3:
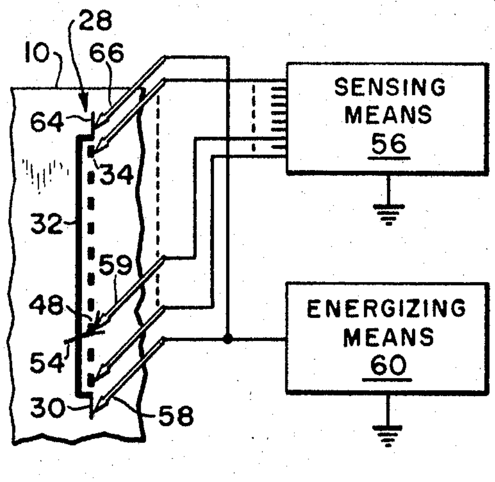
FIGURE 3 is a detail view of a portion of the card of FIGURE 1 showing a stylus made conductive path thereon and related circuitry.

Referring now to FIG. 3, there is shown a portion of the card 10 containing only column 28 of the section 14 for purpose of example, in operation of the invention.

In operation it shall be assumed that the information represented by the isolated element 48 is to be marked on the card. As heretofore stated, this is accomplished very simply, quickly and economically by taking a stylus which leaves a conductive mark, such as a soft lead pencil and drawing a single firm stroke 54 from the potential conducting member 32 to the isolated element 48 as illustrated.

Hence the isolated element 48 is now the only isolated element electrically connected to the terminal 30. The isolated space elements 34, 36, 38, 40, 42, 44, 46, 48 to 52 are each connected to a sensing means 56 and a circuit therewith schematically shown for purposes of illustration only, is completed when the card 10 is driven past a plurality of brushes which search the card 10.

The brushes on the data card transmitter above referred to (not shown here) are aligned to contact simultaneously each of the isolated elements and the terminal 30, 64. In the case of the isolated element 48 a brush 59 is coupled to the sensing means 56 as are all the brushes which pass over the isolated elements, and a brush herein shown as 58 on the aforementioned transmitter is coupled to an energizing means 60 which functions as a source of potential Now at some instant as the card is moved beneath the brushes, the brush 58 will contact terminal 30 and apply a potential to that terminal, and through bridge 33 to the connected conducting member 32. At the same instant that brush 58 contacts terminal 30, the brush 59 connected to the sensing means will contact the isolated element 48 so that a complete circuit will result and the information represented by the isolated element 48 will be sensed and transmitted.

Attention is directed to the fact that the brush 58 can apply a potential through terminal 30, the conductive member 32 and the conductive stroke 54 to the isolated element 48 only when terminal 30 is aligned in contact with the energizing brush 58. At other times the energizing brush is on the insulative surface of the card.

Supposing now that the connecting stroke 54, through inadvertence, accident, or mistake or the like is made between the straight conductive member path 32 and the wrong adjacent isolated element. Or suppose it were desired to reuse a card having one isolated element 48 for example, already connected to the conductive member 32 and substitute another isolated element instead.

Figure 2:
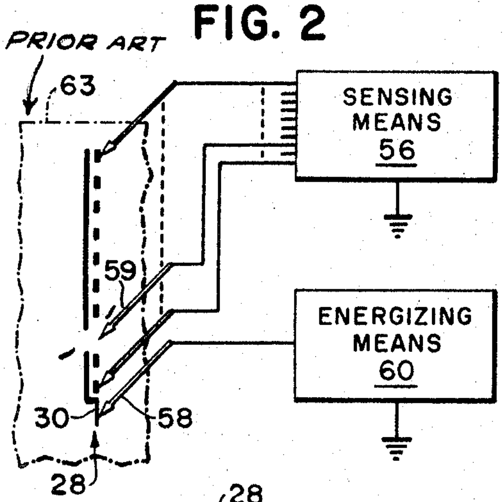
FIG. 2 PRIOR ART
FIGURE 2 is a front view of a portion of a known type of data card prior to the improvement of this invention wth related circuitry.

In the heretofore state of the art as illustrated by a prior card 63 (FIG. 2), any change in the selection of an isolated element could not be made because in attempting to erase the mark 54, the conductive member 32 would be broken, as shown in FIG. 2. Therefore the continuity of the aforementioned circuit, to wit, from the energizing means 60 through the brush 58 to the terminal 30, and to the conductive member 32 and to the particular isolated element 48 and brush 59 to the sensing means 56, would be interrupted and broken by the erasure of a part of the conductive path 32.

It will now be noted that simultaneously isolated elements 34, 36, 38, 40, 42, 44 and 46 were also cut off from terminal 30 and no longer operable, or usable.

Figure 4:
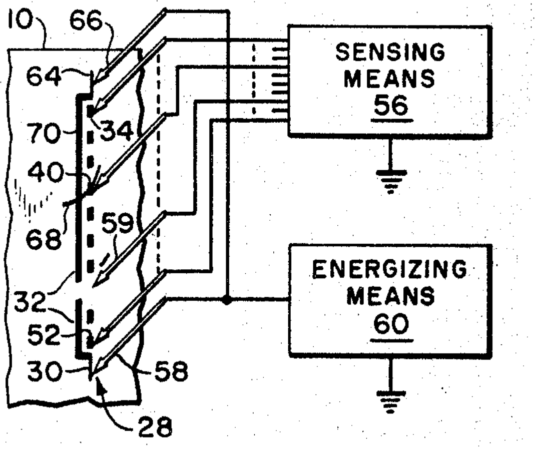
FIGURE 4 is a detail view of the same portion of the card of FIG. 1 shown in FIG. 3 but with a different stylus made conductive mark thereon, with the circuitry related thereto.

The within improvement provides the linear conductive terminal 64 identical to terminal 30, disposed colinearly therewith but in the opposite end of the column of isolated elements as shown in FIGURES 1, 3 and 4. Terminal 64 is connected to adjacent member 32 by a short, conductive bridge 33'. Bridges 33 and 33' are perpendicular to member 32, while terminals 30 and 64 are parallel to member 32, but offset therefrom by bridges 33, 33'.

It will now be evident that in this manner an energizing potential may be imparted to the circuit aforementioned not only by means of the brush 58, but by means of a second and identical brush 66 both parallel to brushes 59 (FIGS. 3 and 4).

In this manner, as shown in FIG. 4, if it is desired, for any of a variety of reasons, to disconnect the isolated element 48 and connect the isolated element 40 for example to the conductive member 32, the connecting stroke 54 is erased (as shown) and the connecting stroke 68 is made instead between the isolated element 40 and member 32.

It will be noted that it is of no consequence if in the erasing process the member 32 is broken adjacent to the isolated element 48 as shown in FIG. 4. The energizing potential for the circuit will now be applied through the brush 66 and the top terminal 64 through the unbroken portion 70 of the conductive member 32, into the new connecting stroke or mark 68, to the newly selected isolated element 40, thence to the sensing means 56 so that now the information represented by the isolated element 40 will be sensed and transmitted instead of that represented by the isolated element 48.

It will be further evident that by the provision of the additional linear terminals 64, at least one error or change or modification in the selection of any particular isolated element is allowable. And similarly, cards used one time only, may be reused a second time.

There are thus provided means whereby the several aims and objects of this invention are achieved in a positive and effective manner.

What is claimed is:

1. Data storage means, comprising a flat support having a generally rectangular electrically insulative surface; a group of data storage columns disposed parallel to each other, spaced laterally slightly apart and extending transversely across said surface; each of said columns comprising an electrically conductive straight member extending transversely across said surface; first and second conductive bridge elements respectively extending perpendicularly to said straight member from opposite ends thereof on said surface; first and second short linear conductive terminals connected to said bridge elements respectively and extending parallel to said straight member on said surface; and a plurality of short, rectangular electrically conductive data storage elements spaced slightly apart on said surface, disposed parallel to said conductive member and spaced slightly therefrom in substantial alignment with the first and second terminals, whereby an electrical potential can be applied to said conductive member from either one of said first and second terminals via one of the bridge elements even though the other one of the first and second terminals is electrically cut off by a discontinuity in said conductive member; the first and second conductive terminals, the bridge ele ments and the conductive elements in each column bein disposed parallel to similar conductive elements and ter minals in the other columns in a direction longitudinall of said surface; whereby a plurality of brushes connecte in circuit with sensing and energizing means can swee across the conductive members, and conductive element and terminals in each column in turn.

References Cited

UNITED STATES PATENTS

| | | | |
|---|---|---|---|
| 233,831 | 11/1880 | Ball ---------------- | 307—6 |
| 2,171,556 | 9/1939 | Higginbottom et al. - | 235—61.1 |
| 2,377,783 | 6/1945 | Hood ---------- | 235—61.11 X |
| 2,598,155 | 5/1952 | Betts. | |

MAYNARD R. WILBUR, Primary Examiner

THOMAS J. SLOYAN, Assistant Examiner

U.S. Cl. X.R.

174—68